(12) United States Patent
Orcutt

(10) Patent No.: US 7,006,268 B2
(45) Date of Patent: Feb. 28, 2006

(54) BRACKET FOR SUPPORTING A TORSIONAL HINGE MIRROR WITH REDUCED HINGE STRESS

(75) Inventor: John W. Orcutt, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/843,058

(22) Filed: May 11, 2004

(65) Prior Publication Data

US 2005/0254149 A1 Nov. 17, 2005

(51) Int. Cl.
  G02B 7/182 (2006.01)
  G02B 7/192 (2006.01)
  G02B 26/08 (2006.01)
(52) U.S. Cl. .............. 359/199; 359/198; 359/225; 359/848; 359/871; 359/900; 248/475.1
(58) Field of Classification Search ........... 359/198, 359/199, 212, 213, 214, 223, 225, 871, 872, 359/847, 848, 900; 347/138, 257; 399/118; 248/475.1
See application file for complete search history.

(56) References Cited

U.S. PATENT DOCUMENTS

| | | | |
|---|---|---|---|
| 6,200,882 B1 * | 3/2001 | Drake et al. | 438/464 |
| 6,288,816 B1 * | 9/2001 | Melville et al. | 359/199 |
| 2005/0078169 A1 * | 4/2005 | Tumer | 347/260 |

* cited by examiner

Primary Examiner—John Juba, Jr.
(74) Attorney, Agent, or Firm—William B. Kempler; W. James Brady, III; Frederick J. Telecky, Jr.

(57) ABSTRACT

The present invention provides methods and apparatus for combining a pivoting mirror and support bracket such that the support bracket transmits little or no stresses to the torsional hinges of the mirror. The bracket includes an isolation slot extending from one edge toward a second edge and then preferably around the mounting areas of the hinge such that stresses applied to the mounting bracket will not be transmitted to each side of the mirror and thereby stress the mirror.

11 Claims, 5 Drawing Sheets

BRACKET FOR SUPPORTING A TORSIONAL HINGE MIRROR WITH REDUCED HINGE STRESS

TECHNICAL FIELD

The present invention relates generally to the field of torsional hinge MEMS scanning engines, and more particularly to a combination torsional hinge pivoting mirror and a support bracket that reduces or substantially eliminates mirror torsional hinge stresses due to bracket deformation during assembly or mounting to a using device.

BACKGROUND

The use of rotating polygon scanning mirrors in laser printers to provide a beam sweep or scan of the image of a modulated light source across a photorestive medium such as a rotating drum is well known. More recently, there have been efforts to use a much less expensive flat mirror with a single reflective surface such as a mirror oscillating in resonance to provide the scanning beam. These scanning mirrors provide excellent performance at a very advantageous cost. Unfortunately, the resonant frequency of the mirror as it pivots about its torsional hinges is highly susceptible to stresses that cause tension or compression of the hinges. Robust mounting brackets are typically used to mount the torsional hinge mirrors to a using device. However, distortion of the bracket itself due to mounting stresses can produce sufficient stress in the mirror hinges that will cause the resonant frequency of the scanning mirror to change beyond acceptable limits or even destroy the mirror.

Therefore, a mounting bracket that limits or substantially eliminates stresses transmitted to the mirror hinges is needed.

Texas Instruments presently manufactures mirror MEMS devices fabricated out of a single piece of material (such as silicon, for example) typically having a thickness of about 100 to 115 microns using semiconductor manufacturing processes. The reflective surface of the mirror may have any suitable perimeter shape such as oval, elongated elliptical, rectangular, square or other. Single axis mirrors include the reflective surface and a pair of torsional hinges, which extend to a support frame or alternately the hinges may extend from the mirror portion to a pair of hinge anchors.

U.S. patent application Ser. No. 10/384,861 describes various techniques for creating the pivotal resonance of the mirror device about the torsional hinges. Thus, by designing the mirror hinges to resonate at a selected frequency, a scanning engine can be produced that provide a scanning beam sweep with only a small amount of energy required to maintain resonance. However, as will be appreciated, the resonant frequency of a pivotally oscillating device about torsional hinges will vary as a function of the stress loading along the axis of the hinges. For example, when the mirror bracket is bolted in place, uneven mounting surfaces can cause the bracket to deform, thereby stressing the mirror hinges and causing a shift in the resonant frequency. Such stressing of the mirror hinges may cause a drift in the resonant frequency of the pivotal oscillations beyond tolerable limits or may actually destroy the mirror.

Since applications that use a scanning light beam, such as a laser printer, and an imaging projector require a stable precise drive to provide a single frequency scan velocity, the changes in the resonant frequency and scan velocity of a pivotally oscillating device due to temperature variations can restrict or even preclude the use of the device in laser printers.

SUMMARY OF THE INVENTION

These and other problems are generally solved or circumvented, and technical advantages are generally achieved, by preferred embodiments of the present invention which provide methods and apparatus that provide a combination pivoting mirror and support bracket with reduced stress transmitted to the mirror through the support bracket. The combination structure comprises a bracket for supporting the pivoting mirror and for attaching the pivoting mirror to a using device such as for example, a laser scanner printer or other display device. The bracket of the combination comprises a first portion having a first side extending to an edge and a second side. A second portion is joined to the first portion along the second side. The first portion further defines first and second mounting areas including for example, a mounting aperture for fixedly securing the support portion to the using device. A mirror mounting aperture located between the first and second mounting areas is also defined in the bracket. Also according to the invention, the support portion further defines an isolation slot extending from the edge on the first side between the mirror mounting aperture and one of the mounting areas toward the second portion joined to the second side.

A pivoting mirror comprises a pair of torsional hinges for pivotally supporting a mirror or reflecting surface, and each hinge of the pair of torsional hinges extends away from the reflecting surface along a selected axis to the anchor portion. The anchor portion of each hinge may comprise a frame around the entire mirror or anchor pads, and is mounted to the support portion of the bracket to suspend the pivoting mirror above the mirror mounting aperture. Thus, the isolation slot, which, according to another embodiment, may further extend along the second side of the first portion towards the first mounting area, means that mounting stresses due to forces resulting from mounting the bracket at areas on each side of the mirror will not be transmitted to the mirror hinges.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Like reference number in the figures are used herein to designate like elements throughout the various views of the present invention. The figures are not intended to be drawn to scale and in some instances for illustrative purposes, the drawings may intentionally not be to scale. One of ordinary skill in the art will appreciate the many possible applications and variations of the present invention based on the following examples of possible embodiments of the present invention.

The present invention relates to a combination bracket and torsional hinged mirror structure suitable for use to provide the repetitive modulating scans of a laser printer or the raster scan of a projection display device. The mirror apparatus of this invention is applicable for use with a single axis resonant mirror according to one embodiment. A second embodiment supports a dual or two axis resonant mirror for providing spaced and parallel scanned lines. The first axis provides resonant pivoting and the second axis allows continuous adjustment of the vertical movement of the beam with respect to the raster scan movement. Since stresses applied to a dual axis or two axis resonant mirror can be transmitted through the first set of hinges that provide the vertical movement of the beam through a gimbals portion to the torsional hinges that support the scanning portion of the mirror, the invention clearly relates to both single axis and dual axis mirrors.

Figure 1A:
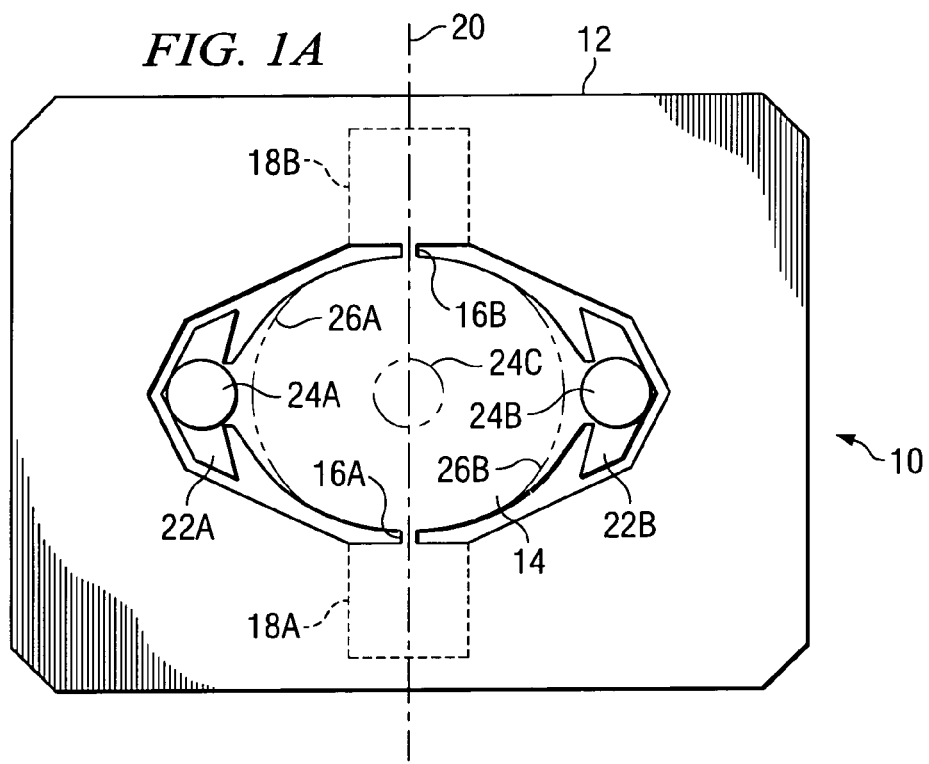
FIGS. 1A and 1B illustrate single torsional hinged mirrors suitable for use with the present invention.

Referring now to FIG. 1A, mirror device 10 includes a reflecting surface 14 supported by a pair of torsional hinges 16a and 16b. A frame member 12 or alternately, a pair of anchor pads 18a and 18b, supports the device 10 along a selected axis 20. According to one embodiment, the mirror device 10 may also include a pair of tabs 22a and 22b for supporting a pair of magnets 24a and 24b used to pivot the reflecting surface or mirror member 14 about selected axis 20. Alternately, the tabs may be omitted as indicated by dashed lines 26a and 26b and a single magnet 24c may be bonded to the back side of the pivoting reflecting surface 14.

Figure 1B:
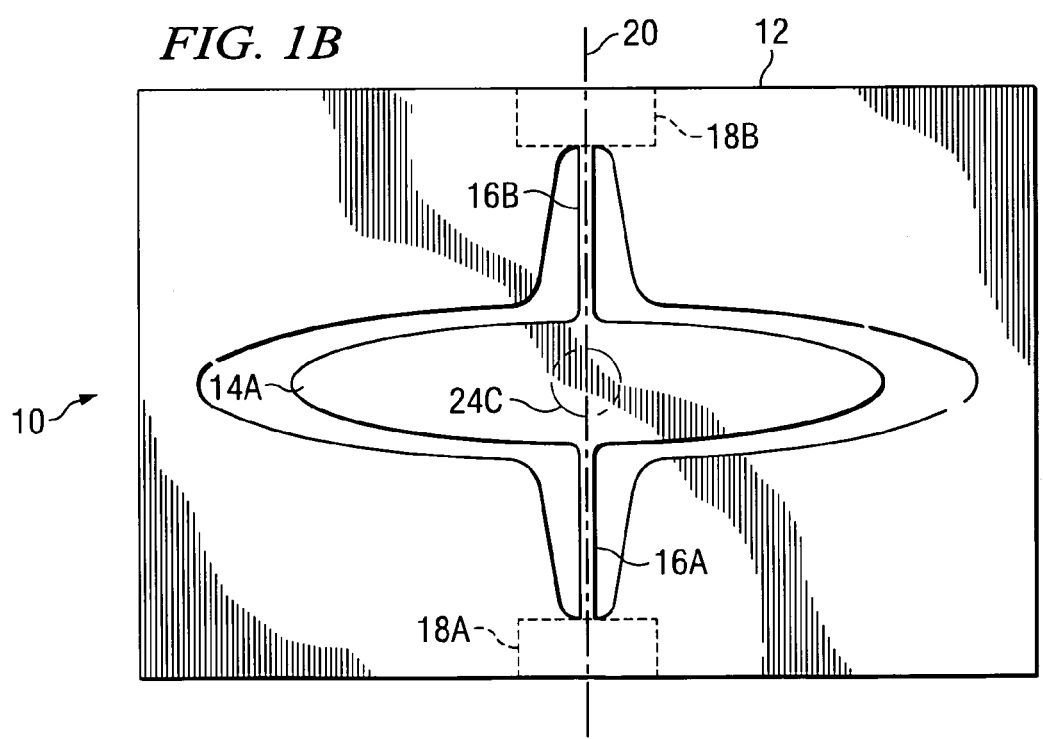

Referring now to FIG. 1B, there is shown another embodiment of a typical single axis mirror device. The operation of the mirror of FIG. 1B is substantially that as discussed with respect to FIG. 1A except the mirror portion 14a has a long elliptical shape. Consequently, FIG. 1B uses the same reference numbers as FIG. 1A to identify similar components of the mirror. The mirror of FIG. 1B can also be driven by permanent magnets attached to the tips of the elongated ellipse, but is shown with the center magnet 24c.

Figure 2A:
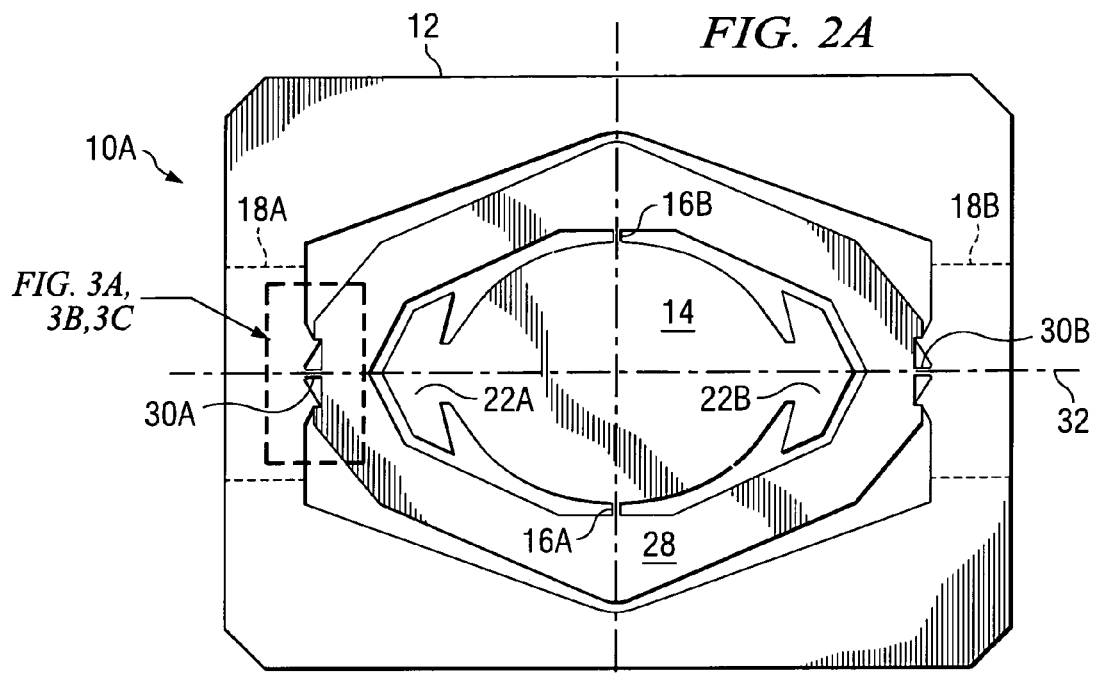
FIGS. 2A, 2B and 2C illustrate various types of dual torsional hinged mirrors. The mirror and bracket combination of the present invention can be adapted to support any of these types of dual hinged mirrors.
Figure 2B:
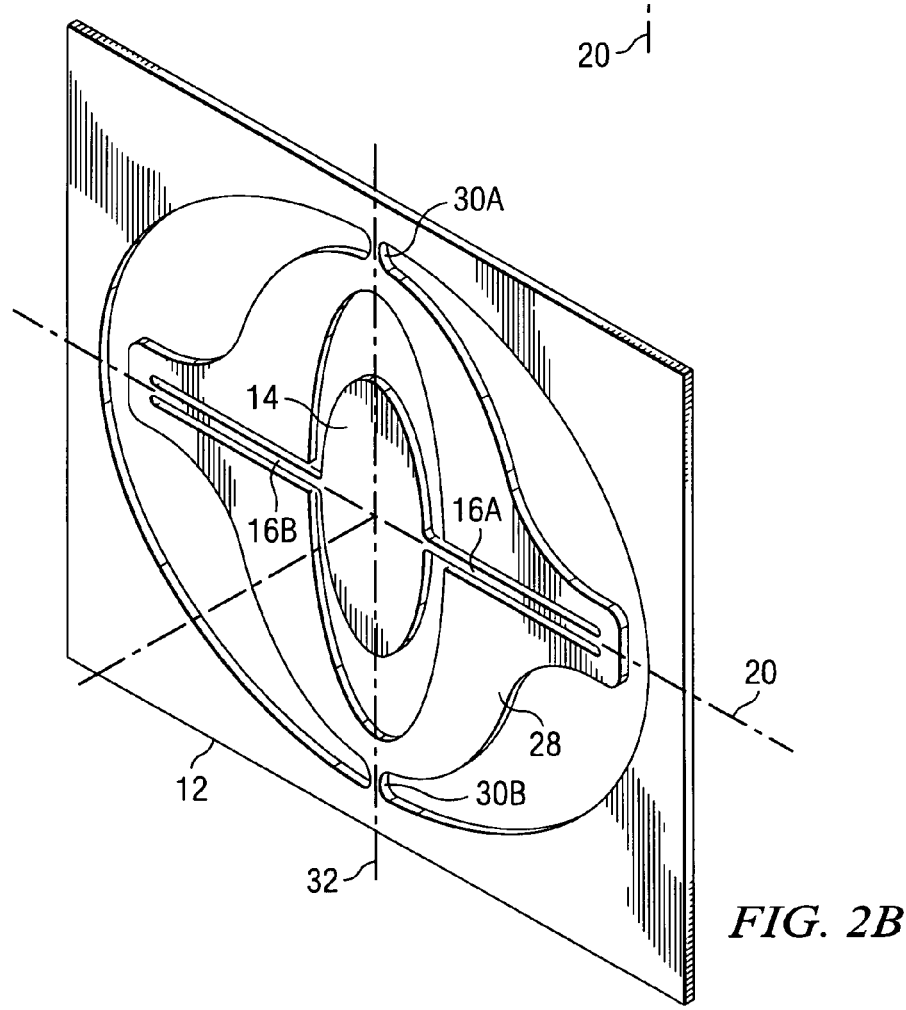
Figure 2C:
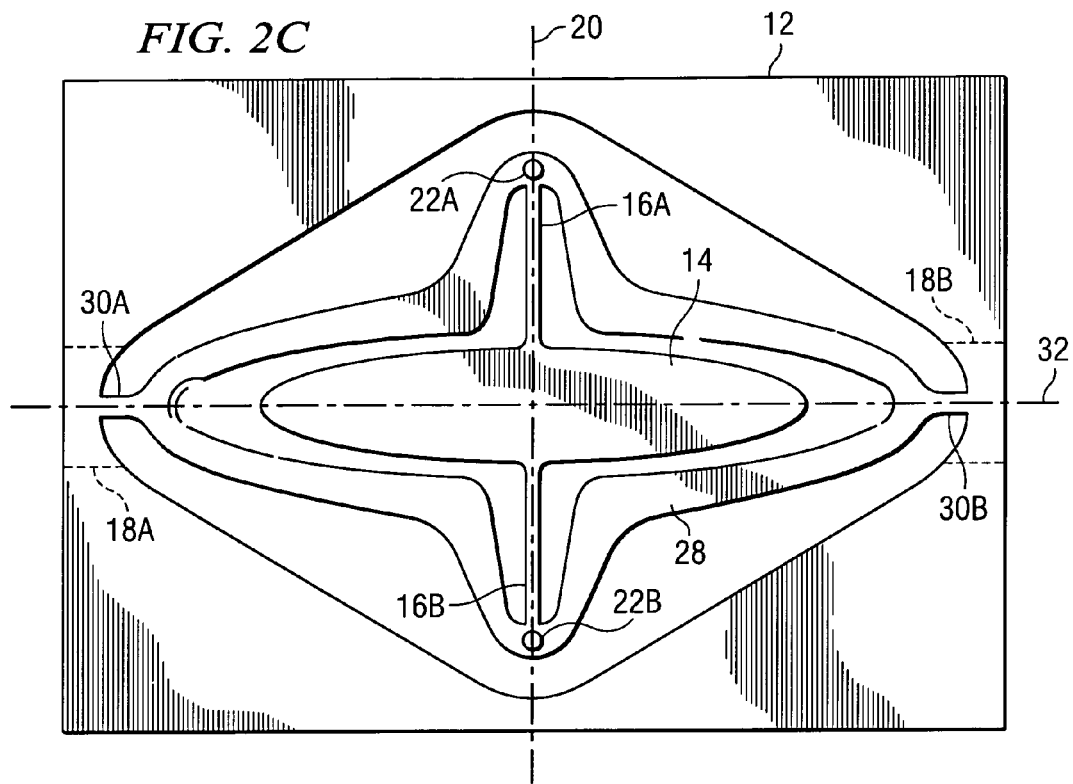

Referring now to FIGS. 2A, 2B and 2C, there are shown examples of various types of dual axis mirrors. For those portions of the mirror device that are similar to the elements of the mirror discussed with respect to FIGS. 1A and 1B, again, the same reference numerals are used.

Referring to FIG. 2A, as shown, the mirror device 10a of FIG. 2A includes a reflecting surface 14 supported by a pair of torsional hinges 16a and 16b. A frame member 12 or alternately, a pair of anchor pads 18a and 18b supports the device 10a. However, in addition to the components that are common to those shown in FIGS. 1A and 1B, the dual axis mirror further includes a gimbal portion 28 and a pair of gimbal hinges 30a and 30b for pivoting the mirror or reflecting surface 14 about axis 32. Axis 32 is typically at a 90° angle with respect to the scanning axis 20. FIG. 2B shows another example of a dual axis mirror and FIG. 2C shows yet another embodiment having the long elliptical shape somewhat similar to that of FIG. 1B. FIG. 2C further shows a pair of drive magnets 22a and 22b for pivoting the gimbals portion 28 about axis 32.

Figure 3A:
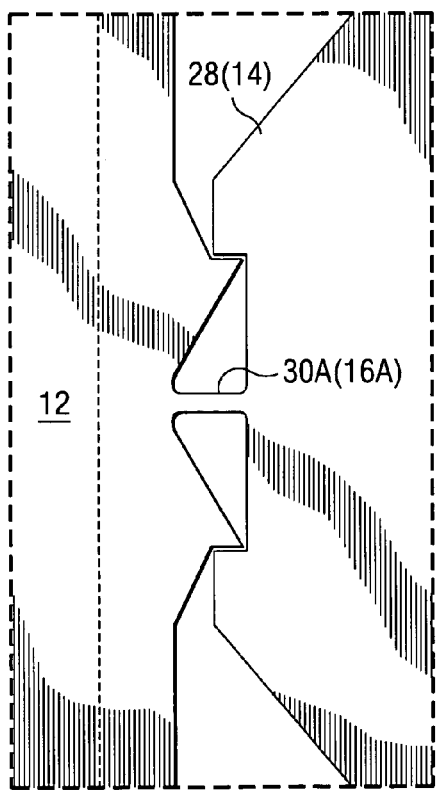
FIGS. 3A, 3B and 3C illustrate an unstressed hinge, a hinge stressed in compression, and a hinge stressed in tension of the type shown in FIG. 1A.
Figure 3B:
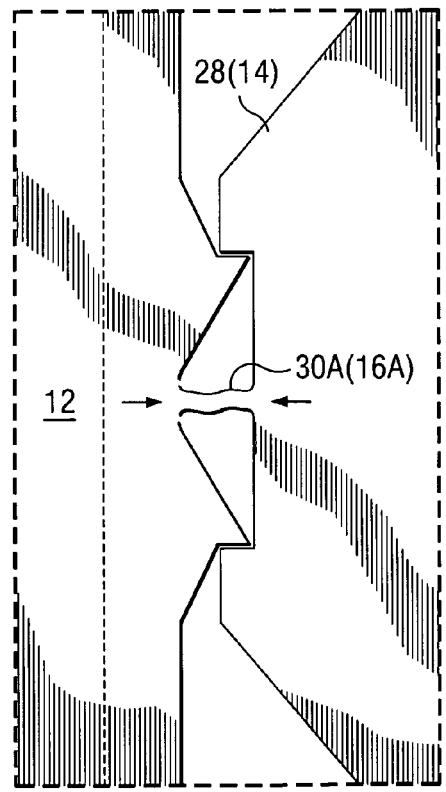
Figure 3C:
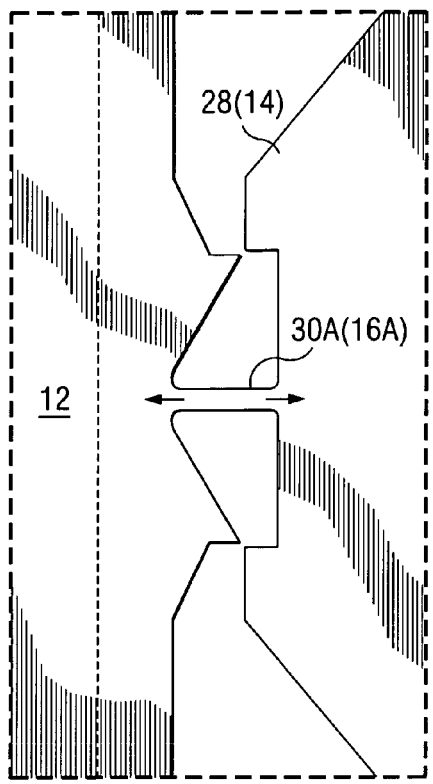
Figure 3D:
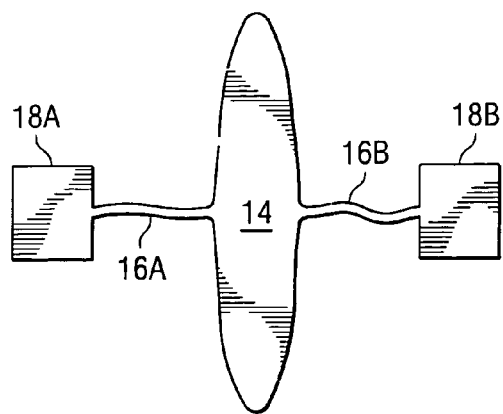
FIG. 3D illustrates a hinge on a mirror similar to the mirror of FIG. 1B under compression forces.

As was discussed above, the hinges of both dual axis and single axis mirrors may be affected by stress on the support members or frame of the mirror device. Therefore, as shown in FIGS. 3A, 3B and 3C, hinges similar to those of 16a and 16b of FIG. 1A and 30a and 30b of FIG. 2A are illustrated with respect to different stresses. For example, FIG. 3A shows an unstressed hinge 30a (16a), FIG. 3B show a hinge 30a (16a) in compression and FIG. 3C shows the same hinge in tension. If these stresses are applied to the gimbal hinges 30a and 30b of FIG. 2A, stress may also be transmitted to the scanning hinges 16a and 16b. FIG. 3D on the other hand, shows the single axis scanning mirror of FIG. 1B with anchor pads 18a and 18b. The mirror of FIG. 3D is also under compressive stress. Therefore, it will be appreciated that the application of the teachings of this invention may be applicable to dual axis mirrors supported by anchor pads and support frames, as well as single axis mirrors supported by anchor pads and/or support frames.

Figure 4:
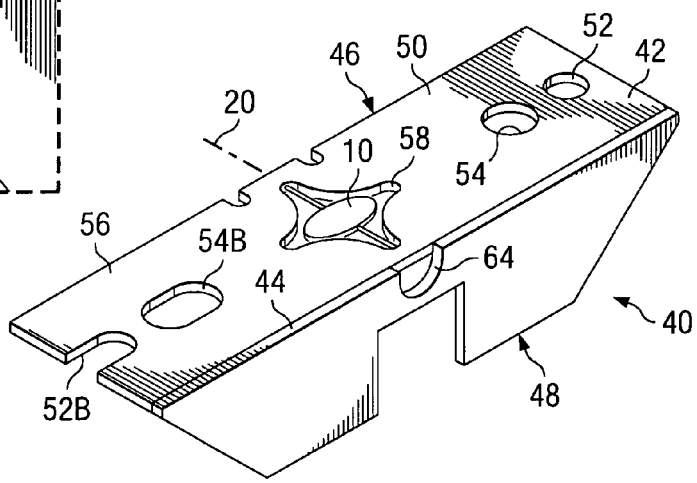
FIG. 4 is a typical mounting bracket designed to support a mirror of the type shown in FIG. 1B.
Figure 5:
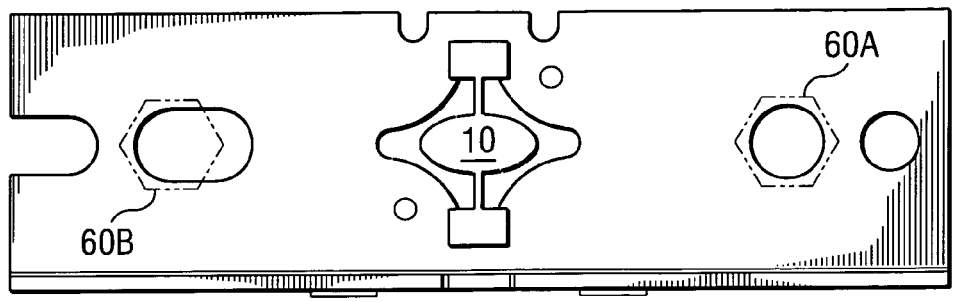
FIG. 5 illustrates how the mounting bracket of FIG. 4 may be mounted by bolts and locater pins to the using device.

Referring now to FIG. 4, there is shown a typical support bracket 40 having a first side 44 and a second side or edge 46. A first portion 42 is joined to a second portion 48 along first side 44. Second portion 48 may be simply a piece of the metal bracket 40 bent at a 90° angle with respect to first portion 42. Alternately, second portion 48 could be welded to first portion 42 along the edge or side 44. The second portion 48 could also simply be an extension or wider area 48a of the first portion 42 as shown in FIG. 6B to be discussed hereinafter. In any event, in the embodiment shown, first portion 42 includes a first mounting area 50 having a first aperture 52a for receiving a locator pin and a second aperture 54a for receiving a bolt to clamp the device to the using item. At the opposite end of the first portion of bracket 40 there is a second mounting area 56 that includes a second slot or aperture 52b for receiving a second locator pin and a second mounting or bolt aperture 54b for receiving a mounting bolt or stud. A mirror mounting aperture 58 is provided such that a mirror device 10 may be bonded or mounted to the bracket 40. In the embodiment shown, the mirror device 10 will rotate about its torsional hinge or scanning axis 20 as discussed above. FIG. 5 is a top view of the bracket 40 of FIG. 4 illustrating the locator pins and mounting bolts. Therefore, as will be appreciated by those skilled in the art, if the mounting surfaces to which the first mounting area 50 and the second mounting area 56 of the mounting bracket 40 are to be mounted are not level, or are not coplanar, then tightening of the mounting bolts 60*a* and 60*b* against these unlevel or non coplanar surfaces may well cause stresses in the mounting bracket, which can be transmitted to the torsional hinges as discussed above.

Figure 6A:
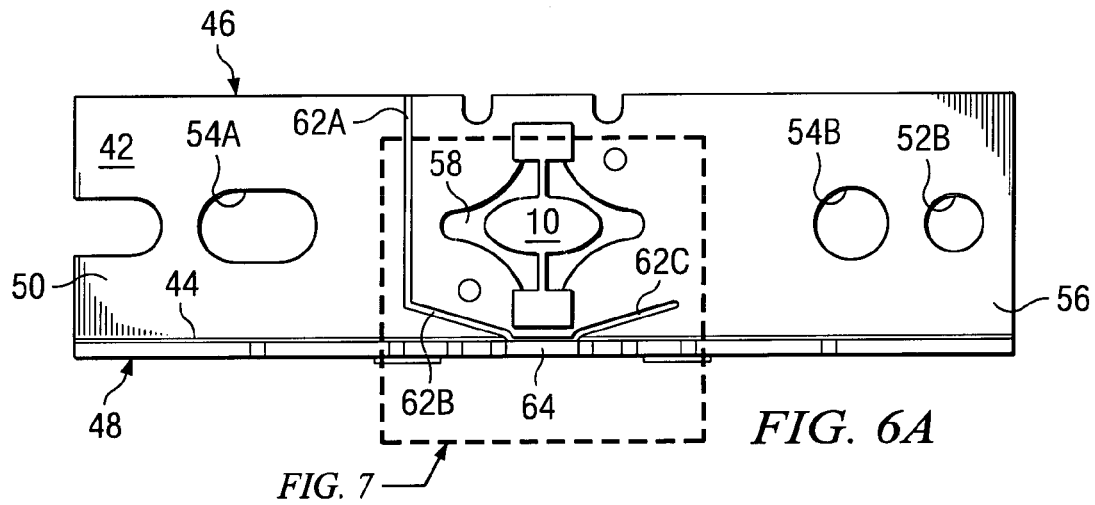
FIGS. 6A and 6B illustrate brackets similar to that of FIG. 4 incorporating the teaches and advantages of the present invention.
Figure 6B:
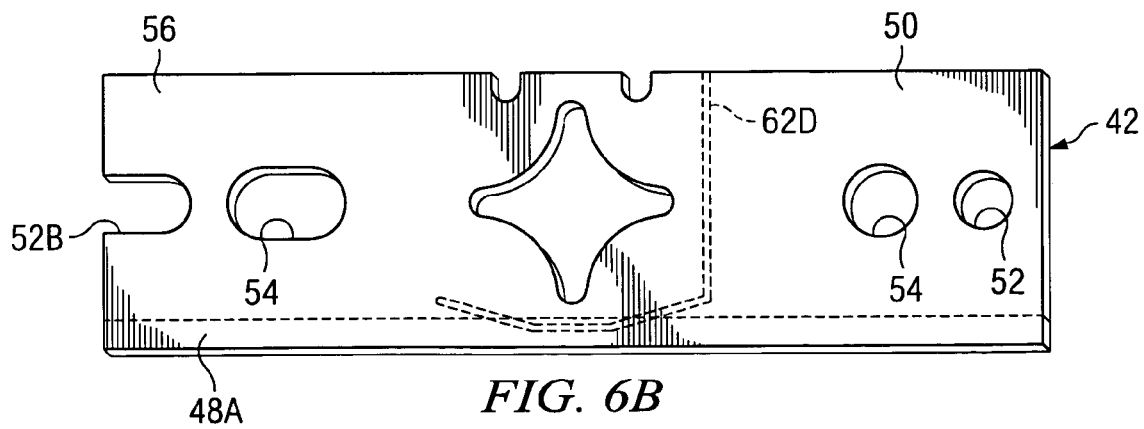

Referring now to FIG. 6A, there is shown a combination mounting bracket and pivoting mirror according to the teachings of the present invention. As can be seen, the mounting bracket is substantially the same as that shown in FIG. 4, except it further defines an isolation slot 62*a* extending from the edge of the second side 46 between the mirror aperture 58 and the mounting area 50 or more specifically mounting aperture 54*a*. It will be appreciated of course, that the slot could extend between mirror aperture 58 and mounting area 56 or mounting aperture 54*b*. The isolation slot 62*a* extends toward the second portion 48, which is joined to the first portion 42. Isolation slot 62*a* could extend all the way directly to the first side or edge 44 where the second portion 48 is joined, or alternately, as shown in FIG. 6A could change its direction before again extending toward the second portion 48. In the embodiment shown in FIG. 6A, the second portion of the isolation slot 62*b* terminates at an aperture 64 formed in the second portion 48. Aperture 64 can better be seen by referring to FIG. 4. Also as shown, even further isolation can also be achieved by extending the isolation slot with a third section 62*c* extending from aperture 64 toward the mounting area 56. In any event, whether the isolation slot includes a single slot portion 62*a*, two slot portions 62*a* and 62*b*, or three slot portions 62*a*, 62*b* and 62*c*, it will be appreciated that a slot will tend to reduce stresses transmitted through the bracket to the torsional hinges of the mirror. Also, as shown in FIG. 6B, it is not necessary that the slot(s) have angular sections such as 62*a*, 62*b* and 62*c*, they could in fact be cut in a arcuate manner 62*d*, etc., as shown.

Figure 7:
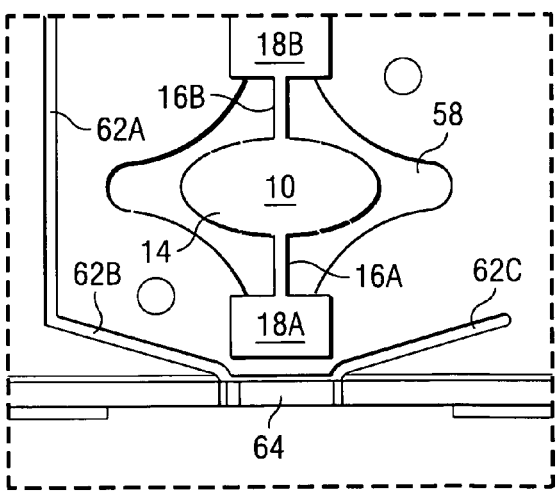
FIG. 7 is an enlarged portion showing the mounted mirror and the isolation slot of FIG. 6A and incorporating the teachings of the present invention.

FIG. 7 is a blown up version of the mirror and the slot of FIG. 6 to better illustrate the invention.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A combination pivoting mirror and support bracket with reduced stress transmitted to said mirror through said bracket, said combination comprising:

a bracket for supporting said pivoting mirror and for attaching said pivoting mirror to a using device, the bracket comprising a first portion having a first side and a second side extending along an edge, and a second portion joined to said first portion along said first side, said first portion defining first and second mounting areas for fixedly securing said first portion to said using device and a mirror mounting aperture located between said first and second mounting areas, said first portion further defining an isolation slot extending from said edge on said second side between said mirror mounting aperture and one of said first and second mounting areas to said second portion joined to said first side; and a pivoting mirror comprising a pair of torsional hinges for pivotally supporting a reflecting surface, each hinge of said pair extending away from said reflecting surface and along a selected axis to an anchor portion and said anchor portion of each hinge mounted to said first portion of said bracket to suspend said pivoting mirror above said mirror mounting aperture.

2. The combination of claim 1 wherein said isolation slot further extends along said first side of said first portion toward the other one of said mounting areas.

3. The combination of claim 1 wherein said second portion is joined along said first side to said first portion at an angle.

4. The combination of claim 3 wherein said angle is substantially a 90° angle.

5. The combination of claim 1 wherein said first and second mounting areas define first and second mounting apertures respectively.

6. The combination of claim 1 wherein said second portion comprises an extension of said first portion beyond said first side.

7. The combination of claim 1 wherein said anchor portion of each hinge of said pair of hinges is a frame.

8. A method of mounting a pivoting mirror supported by a pair of torsional hinges on a bracket to reduce stress transmitted to said mirror through said bracket comprising the steps of:

providing a bracket comprising a first portion having a first side and a second side extending along an edge, and a second portion joined to said first portion along said first side;

defining first and second areas in said first portion for fixedly securing said first portion to a using device;

forming a mirror mounting aperture located between said first and second mounting areas;

defining an isolation slot extending from said edge on said second side between said mirror mounting aperture and one of said first and second mounting areas to said second portion joined to said first side; and attaching said pivoting mirror to said bracket so as to support said pivoting mirror above said mirror mounting aperture.

9. The method of claim 8 further comprising the step of extending said isolation slot along said first side of said first portion toward the other area of said first and second mounting areas.

10. The method of claim 8 further comprising joining said second portion along said first side to said first portion at an angle.

11. The method of claim 10 wherein each angle is substantially a 90° angle.

* * * * *